G. H. NEWTON.
Coupling for Air-Brake.
No. 202,368.  Patented April 16, 1878.
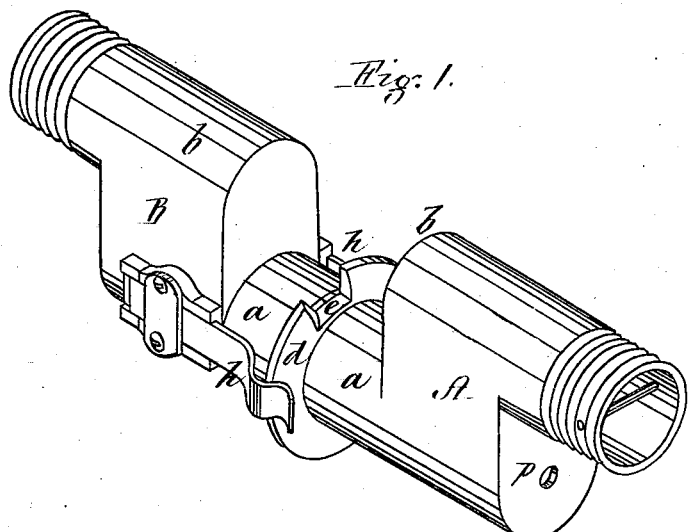
Fig. 1.
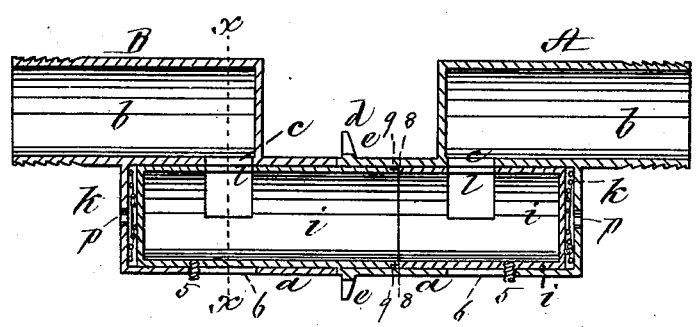
Fig. 2.
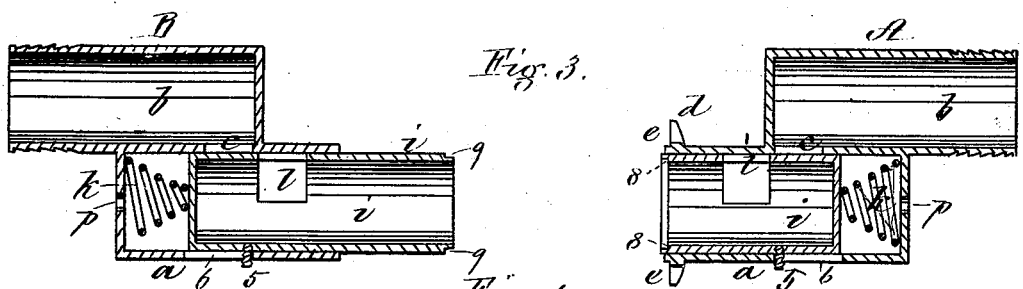
Fig. 3.
Fig. 4.
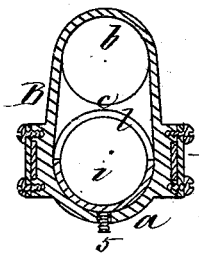
Witnesses,
W. J. Cambridge
Wallace P. Bate
Inventor,
George H. Newton,
per
Teschemacher & Stearns,
Attorneys.

UNITED STATES PATENT OFFICE.

GEORGE H. NEWTON, OF SOUTH FRAMINGHAM, MASSACHUSETTS.

IMPROVEMENT IN COUPLINGS FOR AIR-BRAKES.

Specification forming part of Letters Patent No. 202,368, dated April 16, 1878; application filed March 1, 1878.

*To all whom it may concern:*

Be it known that I, GEORGE H. NEWTON, of South Framingham, in the county of Middlesex and State of Massachusetts, have invented an Improved Self-Closing Coupling for Vacuum and Air Brakes, of which the following is a full, clear, and exact description, reference being had to the accompanying drawings, making part of this specification, in which—

Figure 1 is a perspective view of my improved coupling for connecting the ends of the pipes of vacuum and air brakes. Fig. 2 is a longitudinal vertical section through the center of the same. Fig. 3 is a similar section, showing the position of the parts when the portions of the coupling are disconnected from each other. Fig. 4 is a transverse section on the line $x$ $x$ of Fig. 2.

My invention consists in the application of a self-closing valve of peculiar construction to each half of a coupling for connecting the flexible ends of pipes of vacuum and air brakes, this valve being so constructed as to close instantly in the event of the two portions of the coupling being disconnected, whereby the brakes are prevented from becoming inoperative, as would be the case if the ends of the air-pipe remained unclosed after the separation of the two parts of the coupling.

To enable others skilled in the art to understand and use my invention, I will proceed to describe the manner in which I have carried it out.

In the said drawings, A B represent the two halves of the coupling, each formed, as shown, of two hollow portions, $a$ $b$, the outer end of each portion $b$ being secured to the flexible end of the air-pipe (not shown) which extends under the car, these portions $a$ $b$ being out of line with each other, and communicating through a port or aperture, $c$. One half, A, of the coupling is provided with a flange, $d$, having two notches, $e$, located diametrically opposite each other, and the other half, B, of the coupling is provided with two hook-shaped spring-clasps, $h$, also diametrically opposite each other, which are passed through the notches $e$, and then turned so as to cause their hook-portions to engage with and embrace the flange $d$, whereby the two portions of the coupling are securely held together, it being merely necessary to bring the clasps $h$ into line with the notches in order to detach the two halves A B. Within the portion $a$ of each half of the coupling is placed a tube, $i$, sliding telescopically therein, each tube $i$ being preferably closed at its inner end, and being pressed outward by a helical or other suitable spring, $k$, located behind it, the tube, when pressed out in the position seen in Fig. 3, completely closing the port $c$, the distance to which the tube is forced out by its spring being limited by a stop-pin, 5, sliding in a slot, 6, in the portion $a$.

The tube $i$ of the half B of the coupling is of greater length than the tube $i$ of the half A, and extends out, as seen in Fig. 3, while the tube $i$ of the half A remains within its portion $a$, the outer end of this latter tube being provided on its interior with a shoulder, 8, against which snugly fits a shoulder, 9, on the outside of the end of the other tube $i$, Fig. 2, a lap-joint being thus formed.

When pressure is applied to bring the two halves of the coupling together, the projecting tube $i$ enters the portion $a$ of the half A of the coupling, and forces back the tube $i$ thereof against the resistance of its spring $k$, the projecting tube being simultaneously forced back an equal distance against the resistance of the spring $k$ behind it.

This sliding in of the tubes $i$ $i$ brings a port or aperture, $l$, in each into line with the port or aperture $c$, connecting the two portions $a$ $b$, and thus, when the two halves A B of the coupling are united, as seen in Figs. 1 and 2, a communication is established for the free passage of the air between the two air-pipes connected by the coupling necessary to insure the operation of the brakes. In the event of the two halves of the coupling becoming disconnected while the train is in motion, each tube $i$ is instantly thrown out by its spring $k$, as seen in Fig. 3, so as to cover the port $c$ and tightly close the end of the air-pipe, whereby the brakes are prevented from becoming inoperative, as would be the case if the end of the air-pipe remained open after the separation of the two parts of the coupling.

When the inner end of the tube $i$ is closed, an air-aperture, p, should be formed in the corresponding end of the portion a, to allow the tube to slide freely therein without resistance from the air.

Should the inner end of the tube i be open instead of closed, as shown, the corresponding end of the portion a must be closed. If desired, the springs k may be dispensed with, in which case the tubes i must be made sufficiently loose to allow of their dropping by their own weight into a position to close the port c when the flexible ends of the air-pipes hang down, as is the case when the two halves of the coupling are disconnected.

When the tube i fits loosely within the portion a, the part of the tube covering the port c is drawn tightly around it by the suction of the air.

What I claim as my invention, and desire to secure by Letters Patent, is—

A self-closing coupling for vacuum and air brakes, composed of the two halves or portions A B, each provided with a port, c, in combination with the sliding tubes i i, with their ports, l l, constructed to operate substantially in the manner and for the purpose set forth.

Witness my hand this 25th day of February, A. D. 1878.

GEORGE H. NEWTON.

In presence of—
    P. E. TESCHEMACHER,
    N. W. STEARNS.